US009629133B2

United States Patent
Rosa et al.

(10) Patent No.: US 9,629,133 B2
(45) Date of Patent: Apr. 18, 2017

(54) UPLINK CONTROL INFORMATION SIGNALING IN INTER-SITE DOWNLINK CARRIER AGGREGATION SCENARIOS

(75) Inventors: Claudio Rosa, Randers (DK); Frank Frederiksen, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 110 days.

(21) Appl. No.: 14/405,586

(22) PCT Filed: Jun. 5, 2012

(86) PCT No.: PCT/EP2012/060608
§ 371 (c)(1),
(2), (4) Date: Dec. 4, 2014

(87) PCT Pub. No.: WO2013/182228
PCT Pub. Date: Dec. 12, 2013

(65) Prior Publication Data
US 2015/0131569 A1  May 14, 2015

(51) Int. Cl.
 H04W 72/04 (2009.01)
 H04L 1/00 (2006.01)
 H04L 5/00 (2006.01)
 H04L 1/16 (2006.01)
 H04L 1/18 (2006.01)

(52) U.S. Cl.
 CPC ....... *H04W 72/0413* (2013.01); *H04L 1/0026* (2013.01); *H04L 1/0032* (2013.01);
 (Continued)

(58) Field of Classification Search
 CPC ............ H04W 72/0413; H04W 72/042; H04L 1/0038; H04L 1/1671; H04L 1/0032;
 (Continued)

(56) References Cited

U.S. PATENT DOCUMENTS

| 2013/0153298 A1* | 6/2013 | Pietraski | ................ H04L 5/001 175/45 |
| 2013/0322397 A1* | 12/2013 | Lee | ................... H04W 56/0045 370/329 |
| 2014/0161110 A1* | 6/2014 | Kim | ....................... H04L 5/001 370/336 |

FOREIGN PATENT DOCUMENTS

WO  WO 2011/120432 A1  10/2011

OTHER PUBLICATIONS

Iwamura et al, Carrier Aggregation Framework in 3GPP LTE-Advanced, IEEE Communications Magazine, Aug. 2010, pp. 60-67.*

(Continued)

*Primary Examiner* — Chi H Pham
*Assistant Examiner* — Shailendra Kumar
(74) *Attorney, Agent, or Firm* — Harrington & Smith (57) ABSTRACT

There are provided measures for uplink control information signaling in inter-site downlink carrier aggregation scenarios. Such measures exemplarily include obtaining uplink transmission resources for an uplink control information transmission on said primary carrier, deriving a receiving timing for said uplink control information transmission, detecting said uplink control information transmission on said primary carrier based on said uplink transmission resources and said receiving timing, and decoding uplink control information from said uplink control information transmission.

15 Claims, 7 Drawing Sheets

(52) U.S. Cl.
CPC .......... *H04L 1/0038* (2013.01); *H04L 1/1671* (2013.01); *H04L 5/001* (2013.01); *H04L 5/0037* (2013.01); *H04L 5/0094* (2013.01); *H04W 72/042* (2013.01); *H04L 1/1812* (2013.01); *H04L 5/0069* (2013.01); *H04L 5/0087* (2013.01)

(58) Field of Classification Search
CPC ..... H04L 5/0094; H04L 5/0037; H04L 5/001; H04L 1/0026; H04L 1/1812; H04L 5/0087; H04L 5/0069
See application file for complete search history.

(56) References Cited

OTHER PUBLICATIONS

Shen et al., Overview of 3GPP LTE-Advanced Carrier Aggregation for 4G Wireless Communications, IEEE Communications Magazine • Feb. 2012, pp. 122-130.*

3GPP TSG-RAN WG1 Meeting #66bis, Zhuhai, China, Oct. 10-14, 2011, R1-113371, "Discussions on UL-DL TDD configurations for inter-band CA", ITRI, 7 pgs.

3GPP TS 36.331, V10.5.0 (Mar. 2012), "$3^{rd}$ Generation Partnership Project; Technical Specification Group Radio Access Network; Evolved Universal Terrestrial Radio Access (E-UTRA); Radio Resource Control (RRC); Protocol specification (Release 10)", 302 pgs.

3GPP TS 36.133 V10.6.0 (Mar. 2012), "$3^{rd}$ Generation Partnership Project; Technical Specification Group Radio Access Network; Evolved Universal Terrestrial Radio Access (E-UTRA); Requirements for support of radio resource management (Release 10)", 556 pgs.

Iwmura, M., et al., "Carrier aggregation framework in 3GPP LTE-advanced [WiMAX/LTE Update]". Communications Magazine, IEEE (vol. 48, Issue 8), published Aug. 2010, abstract only, 1 pg.

Shen, Z., et. al., "Overview of 3GPP LTE-advanced carrier aggregation for 4G wireless communications", Communications Magazine, IEEE (vol. 50, Issue 2), published Feb. 2012, abstract only, 1 pg.

* cited by examiner

UPLINK CONTROL INFORMATION SIGNALING IN INTER-SITE DOWNLINK CARRIER AGGREGATION SCENARIOS

FIELD

The present invention relates to uplink control information signaling in inter-site downlink carrier aggregation scenarios. More specifically, the present invention exemplarily relates to measures (including methods, apparatuses and computer program products) for realizing uplink control information signaling in one of possible inter-site downlink carrier aggregation scenarios.

BACKGROUND

The present specification generally relates to transmission of control data from a terminal to base stations in network deployments providing inter-site downlink carrier aggregation.

Inter-site downlink carrier aggregation (CA) means aggregation of a primary carrier and at least one secondary carrier, wherein the carriers are provided by base stations on different sites. Inter-site CA with non-fiber based connection between the transmission nodes, i.e. the involved base stations (e.g. evolved NodeB, eNB) is a considered concept for Rel-12/Rel-13 of the $3^{rd}$ Generation Partnership Project (3GPP) Evolved Universal Terrestrial Radio Access (E-UTRA) specifications, i.e. for Long Term Evolution (LTE) Rel-12/Rel-13 specifications. The main use case for inter-site CA is considered to be in heterogeneous network deployments, i.e. HetNet deployments, with dedicated carrier at pico layer. In such network deployments, inter-site CA represents a cost efficient solution enabling low cost/capacity transport for pico cells and offloading for macro cell with no service degradation to terminals like user equipments (UE). Actually, UEs might even experience performance increase in terms of increased downlink throughput and improved mobility robustness with rapidly varying radio conditions (due to make-before-break and/or early handover to small cells).

Due to the assumption of a high latency/low capacity connection between the transmission nodes, inter-site CA implies distributed Layer 1 (L1)/Layer 2 (L2) radio resource management (RRM). That means that functionalities such as channel-aware scheduling, fast adaptive modulation and coding (AMC) and L1 hybrid automatic repeat request (HARQ) have to be performed separately at the macro eNB and the pico eNBs.

As a consequence, uplink control information (UCI) transmitted from the UE to assist fast L1/L2 RRM in principle needs to be separately signaled to the macro eNB and the pico eNB. Currently with Rel-10 specification, UCI is by default transmitted on the primary cell (PCell). That is, assuming that with inter-site CA the component carrier used at macro eNB is configured as PCell, UCI information (including channel quality indicator (CQI) and HARQ acknowledgment/negative acknowledgement (A/N) for the secondary cell (SCell) provided by the pico eNB) is only available at the macro eNB.

Several solutions considering physical uplink control channel (PUCCH) configuration on SCell have been proposed, wherein dual-carrier transmission capable terminals as well as single-carrier transmission capable terminals are considered. However, all the proposed solutions require changes to the 3GPP specifications and a new UE category, which is expectable earliest in LTE Rel-12. This might mean that the inter-site CA concept with high latency low capacity connection between eNBs will in practice be usable by operators first around 2018-2019.

Hence, the problem arises that an implementation of the inter-site CA concept, in particular of the transmission of UCI control information to each of the involved base stations require drastic changes to the 3GPP specifications which are not able to be assembled in either LTE Rel-10 or Rel-11 specifications.

Hence, there is a need to provide for uplink control information signaling in inter-site downlink carrier aggregation scenarios, in particular for LTE Rel-10 and onwards network deployments.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method of a device providing primary cell functionality for communication in inter-site carrier aggregation mode aggregating a primary carrier and at least one secondary carrier, comprising transmitting a downlink transmission, said downlink transmission being used as a timing reference, receiving an uplink transmission comprising at least a time difference, calculating a first receiving timing based on an estimated second receiving timing at said device, said time difference and a predetermined timing advance value, and transmitting a first inter-site control transmission comprising at least a difference between said calculated first receiving timing and a timing of said transmitting said downlink transmission.

According to an exemplary aspect of the present invention, there is provided a method of a device providing secondary cell functionality for communication in inter-site carrier aggregation mode aggregating a primary carrier and at least one secondary carrier, comprising obtaining uplink transmission resources for an uplink control information transmission on said primary carrier, deriving a receiving timing for said uplink control information transmission, detecting said uplink control information transmission on said primary carrier based on said uplink transmission resources and said receiving timing, and decoding uplink control information from said uplink control information transmission.

According to an exemplary aspect of the present invention, there is provided an apparatus providing primary cell functionality for communication in inter-site carrier aggregation mode aggregating a primary carrier and at least one secondary carrier, said apparatus comprising a connection controller configured to transmit a downlink transmission, said downlink transmission being used as a timing reference, and to receive an uplink transmission comprising at least a time difference, and a control module configured to calculate a first receiving timing based on an estimated second receiving timing at said device, said time difference and a predetermined timing advance value, wherein said connection controller is further configured to transmit a first inter-site control transmission comprising at least a difference between said calculated first receiving timing and a timing of said transmitting said downlink transmission.

According to an exemplary aspect of the present invention, there is provided an apparatus providing secondary cell functionality for communication in inter-site carrier aggregation mode aggregating a primary carrier and at least one secondary carrier, said apparatus comprising a connection controller configured to obtain uplink transmission resources for an uplink control information transmission on said primary carrier, to derive a receiving timing for said uplink control information transmission, to detect said uplink control information transmission on said primary carrier based on said uplink transmission resources and said receiving timing, and to decode uplink control information from said uplink control information transmission.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient signaling of UCI from a terminal to each of the involved base stations in a network deployment implementing inter-site downlink carrier aggregation.

By way of exemplary embodiments of the present invention, there is provided uplink control information signaling in inter-site downlink carrier aggregation scenarios. More specifically, by way of exemplary embodiments of the present invention, there are provided measures and mechanisms for realizing uplink control information signaling in inter-site downlink carrier aggregation scenarios.

Thus, improvement is achieved by methods, apparatuses and computer program products enabling/realizing uplink control information signaling in inter-site downlink carrier aggregation scenarios.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, UCI transmission and receiving is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

In particular, the present invention and its embodiments may be applicable in any network compound inter-site CA aggregating multiple base stations and in which uplink information is to be transmitted from a terminal to the involved base stations is to be performed.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) uplink control information signaling in inter-site downlink carrier aggregation scenarios.

According to exemplary embodiments of the present invention, a UE assisted SCell node reception time adjustment algorithm is introduced. At that, the SCell node (e.g. the pico eNB) will receive timing information from another node in the network that is hosting the PCell (e.g. the macro eNB). The algorithm is targeted at utilizing and combining existing signaling mechanisms to provide the needed multi-cell operation at different eNBs. The proposed operation/functionality is illustrated in FIG. 5.

Figure 5:
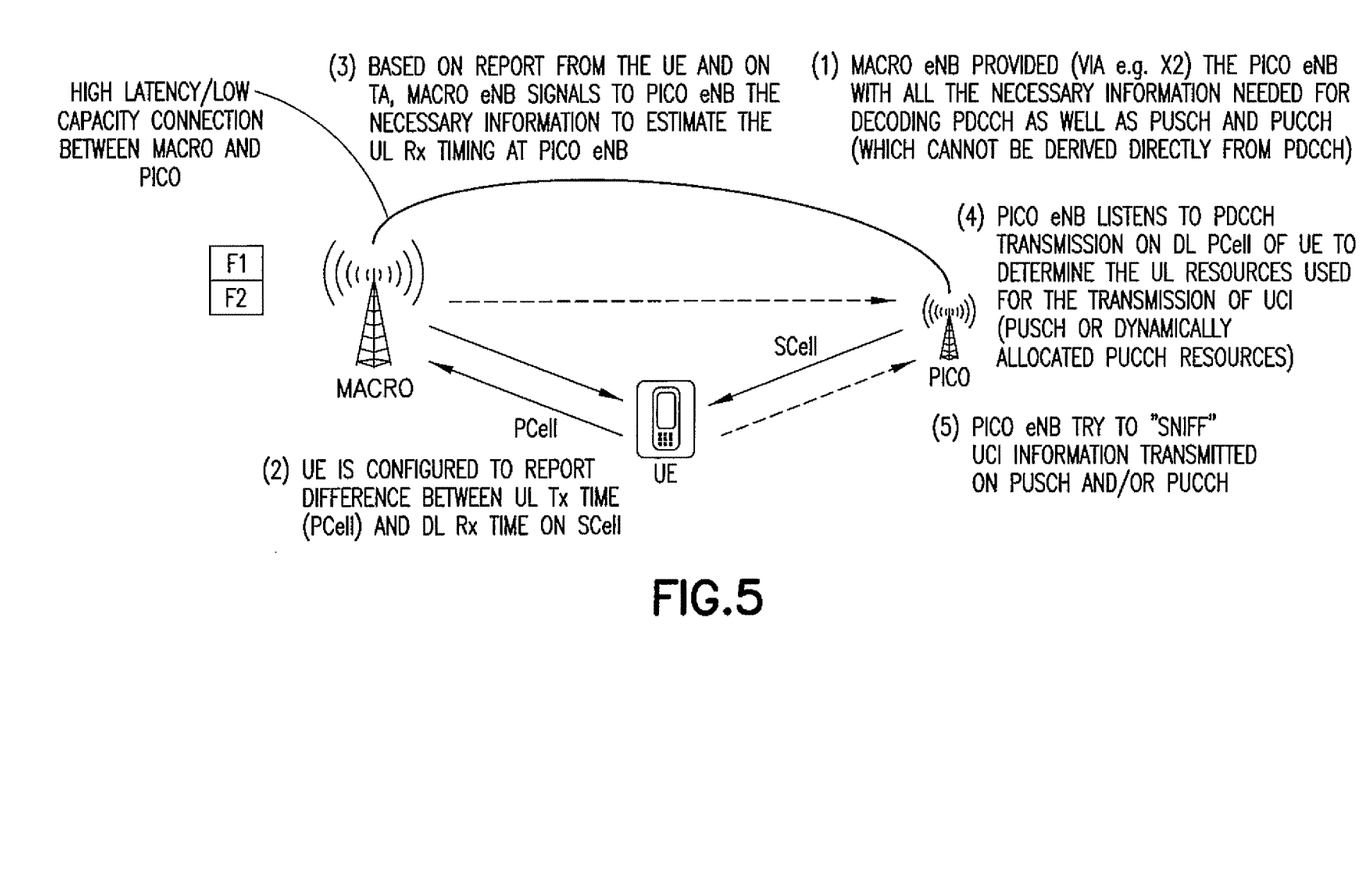
FIG. 5 is a schematic diagram illustrating different signaling between apparatuses according to exemplary embodiments of the present invention.

FIG. 5 is a schematic diagram illustrating different signaling between apparatuses according to exemplary embodiments of the present invention.

According to the general overview provided by FIG. 5, a Macro eNB hosts a PCell characterized by carrier frequency F1, whereas a Pico eNB hosts a SCell characterized by carrier frequency F2. At that, the UE is connected to both of the eNBs, and inter-site downlink CA is performed. The macro eNB and the pico eNB communicate via an inter-site connection with high latency and low capacity.

First of all, the macro eNB provides the pico eNB with information needed for decoding a physical downlink control channel (PDCCH) on primary carrier as well as information needed for decoding physical uplink shared channel (PUSCH) and PUCCH on primary carrier which can not be derived from PDCCH. At that, that information are provided via the intersite connection using e.g. an X2 interface known for usage to interconnect eNBs.

Secondly, the UE reports, on PCell (i.e. with the macro eNB as the intended receiver) a difference between an uplink transmission time (of the report itself) and a downlink receiving time of a transmission received on SCell (i.e. with the pico eNB as the sender). Of course, the pico eNB has to transmit such downlink transmission.

Next, based on the difference reported by the UE, and based on a timing advance (TA) which is set by the macro eNB, the macro eNB calculates necessary information regarding an uplink receiving timing (of a transmission comprising UCI on PCell) estimated for the pico eNB, and transmits this information to the pico eNB, preferably via the inter-site connection.

Thereafter, the UE transmits this transmission comprising UCI on PCell, i.e. with the macro eNB as the intended receiver.

However, since the information necessary for decoding are known to the pico eNB, it is able to listen to PDCCH downlink transmission on PCell of the respective UE to determine the uplink resources for the transmission comprising UCI, and since the estimated uplink receiving timing is known to the pico eNB, it is able to detect the transmission comprising UCI on PCell and can try to sniff the UCI transmitted on the uplink resources.

In sum, for the estimation of the uplink receiving timing at pico eNB of uplink signal transmitted by the UE on carrier frequency scheduled by the macro eNB (i.e. F 1), following mechanisms are proposed according to the present invention. A UE according to exemplary embodiments of the present invention is configured to measure and report the difference between the uplink transmission time on PCell (F1) and the downlink receiving time on SCell (F2) as specified in 3GPP technical specifications TS 36.133 (section 9.1.9.1) and TS 36.331. The macro eNB according to exemplary embodiments of the present invention uses the reported measurement to calculate the difference between macro eNB to UE propagation delay and pico eNB to UE propagation delay. This information is then signaled to the pica eNB (via e.g. X2) and used to estimate the uplink receiving timing at the pico eNB.

Further, the following mechanisms allowing the pico eNB to determine the physical resources used by the UE for transmitting the UCI via PCell are proposed. The pico eNB is equipped with a receiving unit capable of receiving signals transmitted using carrier frequency used at macro eNB (i.e. F1). It is to be noted that this is applicable for frequency division duplex (FDD) technique. However, it is held to be clear that in time division duplex (TDD) scenario the pico eNB is equipped with a receiving unit capable of receiving signals transmitted during time slots used at macro eNB. In this way, the pico eNB can try to decode both the downlink signal transmitted by the macro eNB (e.g. to determine the uplink resources used for the transmission of UCI when these are dynamically allocated based on PDCCH transmission on PCell), as well as the uplink signal transmitted by the UE (e.g. to try to decode the corresponding UCI).

Examples for dynamically allocated resources for the transmission of UCI are physical hybrid ARQ indicator channel (PHICH) format la/lb used for the transmission of HARQ A/N, as well as the case when UCI is punctured together with data to be transmitted. For semi-statically allocated resources (e.g. PUCCH format 1a/1b on dedicated PUCCH resources as well as PUCCH format 2/2a/2b used for the transmission of periodic CQI—potentially combined with simultaneous transmission of A/N information), the UL resources could be signaled to the pico eNB directly from the macro eNB using X2 interface.

Knowing the uplink resources used for the transmission of UCI and having all the necessary information for the detection of the uplink transmitted signal on PCell (including an estimation of the uplink receiving timing on the pico eNB), the pico eNB can make an attempt to decode the UCI and use it to support fast L1/L2 RRM decisions.

For implementing the mentioned idea and the proposed corresponding mechanisms, the following assumptions are made:

the dedicated carrier is deployed at/hosted by the pico eNB (that is, F1 used at macro eNB and F2 is used at pico eNB), downlink transmissions from macro eNB and pico eNB in corresponding coverage area are synchronized, the UE does not support CA in uplink, and the (value of the) TA used by the UE is known by the macro eNB (since it is signaled to the UE by the macro eNB itself).

A UE is configured to report to the macro eNB the difference between the SCell (F2) downlink receiving time and the PCell (F1) uplink transmission time (of the report itself).

At that, the uplink resources used for the transmission of UCI on PCell are known at the UE because either signaled by the macro eNB (e.g. PUCCH resources used for transmission periodic CQI) or can be derived from PDCCH allocation transmitted on PCell (could be an uplink allocation, that is PUSCH resources, as well as a downlink allocation with implicitly allocated PUCCH resources for HARQ A/N transmission) or on SCell.

It is to be noted that, according to exemplary embodiments of the present invention, the uplink transmission resources may comprise at least one of a frequency, a transmission format (e.g. PUCCH format 1a/1b) and a time slot, and the uplink control information may comprise at least one of a CQI and HARQ A/N information.

Figure 1:
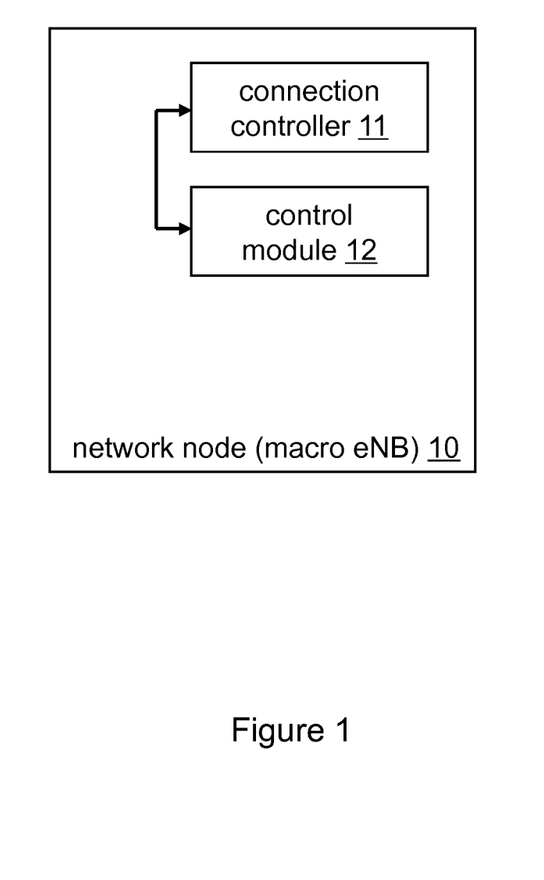
FIG. 1 is a block diagram illustrating an apparatus according to exemplary embodiments of the present invention.

FIG. 1 is a block diagram illustrating an apparatus according to exemplary embodiments of the present invention.

As shown in FIG. 1, according to exemplary embodiments of the present invention, the apparatus is a network node 10 (e.g. a macro eNB) comprising a connection controller 11 and a control module 12. The apparatus 10, i.e. the connection controller 11 provides primary cell functionality for communication in inter-site carrier aggregation mode aggregating a primary carrier and at least one secondary carrier. Further, the connection controller 11 transmits a downlink transmission, said downlink transmission being used as a timing reference, and receives an uplink transmission comprising at least a time difference.

The control module 12 calculates a first receiving timing based on an estimated second receiving timing at said device, said time difference and a predetermined timing advance value.

Further, the connection controller 11 transmits a first inter-site control transmission comprising at least a difference between said calculated first receiving timing and a timing of said transmitting said downlink transmission.

According to further exemplary embodiments of the present invention, the connection controller 11 transmits a second inter-site control transmission comprising at least detection information for detection of certain downlink transmission resources of a downlink control transmission on said primary carrier, said certain downlink transmission resources being indicative of at least uplink transmission resources for an uplink control information transmission on said primary carrier.

In other words, the macro eNB may provide a pico eNB with all information needed for the detection of PDCCH transmitted by the macro eNB towards a UE (configured in CA in between F1 and F2). Such detection information may be a certain search space of a PDCCH and an identifier of an intended receiver, i.e. the specific UE.

According to still further embodiments of the present invention, the connection controller 11 transmits a third inter-site control transmission comprising at least uplink transmission resources for an uplink control information transmission on said primary carrier.

In other words, the macro eNB may provide a pico eNB with information for the detection of PUSCH/PUCCH that cannot be derived from PDCCH (e.g. periodic CQI). The main information thereof corresponds to the same information that a UE receives and decodes on the air interface prior to initial access. This includes, for example, uplink bandwidth, PCell uplink carrier frequency (from the system information block 2 (SIB2)), as well as the information that is contained in the PUCCH-config information element (see 3GPP technical specification TS 36.331), which contains information on the number of physical resource blocks (PRB) reserved for PUCCH, amount of these resources that are reserved for scheduling requests, reserved for A/N, and for periodic CSI transmission. At that, such inter-site control transmission may be an X2 signaling.

According to still further exemplary embodiments of the present invention, the control module 12, in order to calculate a first receiving timing, computes this first receiving timing (UL Rx PCell at pico) based on the estimated second receiving timing at said device (UL_Rx_PCell at macro), the time difference (T_diff) and the predetermined timing advance value (TA) using the formula UL_Rx_PCell_at_pico=UL_$_{Rx}$_PCell_at_−macro−T_diff−TA+4ms.

Figure 6:
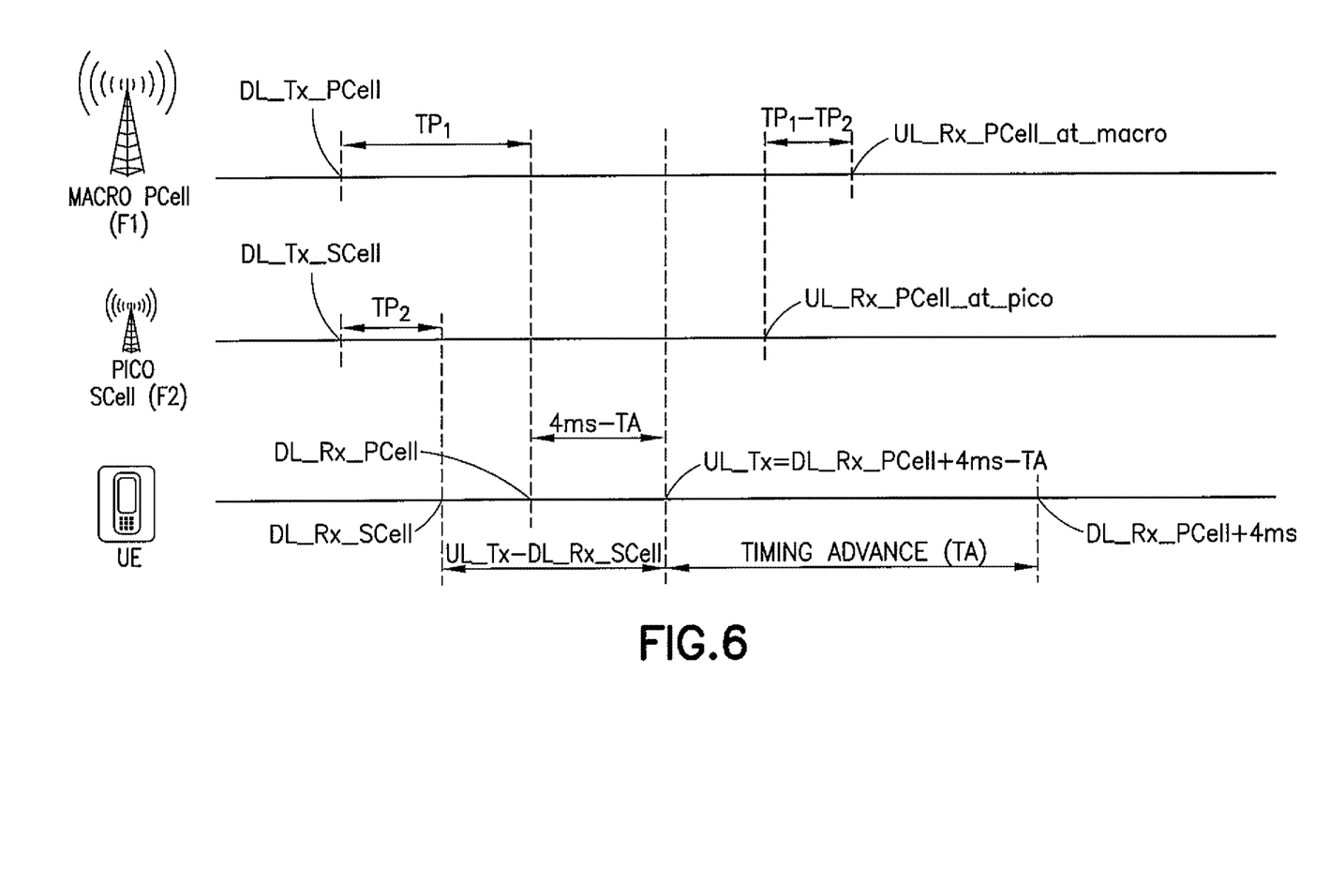
FIG. 6 is a schematic diagram illustrating signaling timings according to exemplary embodiments of the present invention.

The calculation steps are further described referring to FIG. 6 illustrating signaling timings according to exemplary embodiments of the present invention. At that, the boxed expressions represent moments in time, wherein DL_Tx_PCell means a timing of a downlink transmission on PCell (i.e. sender is macro eNB), DL_Tx_SCell means a timing of a downlink transmission on SCell (i.e. sender is pico eNB), DL_Rx_PCell means a timing of a downlink receiving on PCell by UE, DL_Rx_SCell means a timing of a downlink receiving on SCell by UE, UL_Tx means a timing of an uplink transmission (reporting the difference between the uplink transmission time (of the report itself, UL_Tx) and the downlink receiving time of a transmission received on SCell (DL_Rx_SCell)) by the UE, UL_Rx_PCell at pico means a timing of an uplink receiving of a UCI transmission on PCell intended for the macro eNB received by the pico eNB, and UL_Rx_PCell_at_macro means a timing of an uplink receiving of a UCI transmission on PCell intended for the macro eNB and received by the macro eNB.

Further, some periods are indicated by double arrows and associated expressions.

The macro eNB can estimate the uplink receiving time at pico eNB based on the difference between the propagation delay macro eNB to UE ($TP_1$) and the propagation delay pico eNB to UE ($TP_2$):

UL_Tx=DL_Rx_PCell+4ms−TA=DL_Tx_PCell+
  $TP_1$+4ms−TA    (1)

UL_Tx=DL_Rx_SCell+[UL_Tx−DL_Rx_
  SCell]=DL_Tx_SCell +$TP_2$+[UL_Tx−DL_
  Rx_SCell]    (2)

When, substituting (1) into (2) (that is, UL_Tx=UL_Tx)

DL_Tx_PCell+$TP_1$+4ms−TA=DL_Tx_SCell+$TP_2$+
  [UL_Tx−DL_Rx_SCell], and assuming downlink synchronization between macro and pico (i.e. DL_Tx_PCell=DL_Tx_SCell) following is obtained:

$TP_1$+4ms−TA=$TP_2$+[UL_Tx−DL_Rx_SCell], such that a difference between the propagation delay macro eNB to UE ($TP_1$) and the propagation delay pico eNB to UE ($TP_2$), i.e. [$TP_1$-$TP_2$] can be obtained as:

[$TP_1$-$TP_2$]=[UL_$_{Tx}$−DL_Rx_SCell]+TA−4ms, wherein [UL_Tx−DL_Rx_SCell] corresponds to T diff.

The macro eNB finally estimates the uplink receiving timing at pico eNB as:

UL_Rx_PCell_at_pico=UL_Rx_PCell_at_macro−
  [$TP_1$-$TP_2$].

Note that in order to perform such calculation the macro eNB is supposed to have an accurate estimate of the uplink receiving time at macro eNB (which is self-evident since needed anyway to decode the uplink signal at macro eNB), as well as to know the TA value used by the UE (which is self-evident since it is signaled by the macro eNB itself).

The macro eNB signals to the pico eNB the difference between the estimated uplink receiving time at pico eNB (UL_Rx_PCell_at_pico) and the downlink transmission time at macro eNB (DL_Tx_PCell). The pico eNB can finally use this information to derive the uplink receiving time at pico eNB based on DL_TX_SCell, i.e. by adding the received difference and the downlink transmission time at pico eNB (DL_Tx_SCell). Assuming downlink synchronization, DL_TX SCell=DL_TX_PCell, merely the estimated uplink receiving time at pico eNB (UL_Rx_PCell_at_pico) could be transmitted. However, in principle the idea is also applicable to the case of unsynchronized downlink transmission as long the difference in downlink transmission timing between macro eNB and pico eNB is known. Hence, by transmitting the proposed difference, the pico eNB does not need to know the exact downlink transmission time at macro eNB (DL_Tx_PCell), but only its own downlink transmission time at pico eNB (DL_Tx_SCell).

It is to be noted that, according to exemplary embodiments of the present invention, the uplink transmission resources may comprise at least one of a frequency, a transmission format (e.g. PUCCH format 1*a*/1*b*) and a time slot, and the uplink control information may comprise at least one of a CQI and HARQ A/N information.

Figure 2:
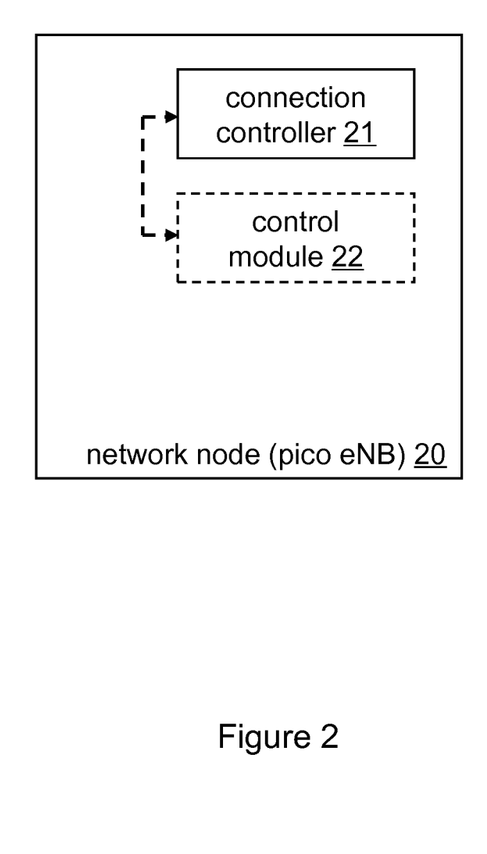
FIG. 2 is a block diagram illustrating an apparatus according to exemplary embodiments of the present invention.

FIG. 2 is a block diagram illustrating an apparatus according to exemplary embodiments of the present invention.

As shown in FIG. 2, according to exemplary embodiments of the present invention, the apparatus is a network node 20 (e.g. a pico eNB) comprising a connection controller 21. The apparatus 20, i.e. the connection controller 21 provides secondary cell functionality for communication in inter-site carrier aggregation mode aggregating a primary carrier and at least one secondary carrier.

Further, the connection controller 21 obtains uplink transmission resources for an uplink control information transmission on said primary carrier, and derives a receiving timing for said uplink control information transmission.

Based on said uplink transmission resources and said receiving timing, the connection controller 21 further detects the uplink control information transmission on said primary carrier, and decodes uplink control information from said uplink control information transmission.

According to further embodiments of the present invention, the connection controller 21 transmits a downlink transmission, said downlink transmission being used as a timing reference, and receives a first inter-site control transmission comprising at least a time difference.

In other words, the difference between the estimated uplink receiving time at pico eNB (UL_Rx_PCell_at_pico) and the downlink transmission time at macro eNB (DL_Tx_PCell) is signaled to the pico eNB by the macro eNB. The pico eNB can finally use this information to derive the uplink receiving time at pico eNB based on DL_TX_S-Cell (assuming DL synchronization, i.e. on DL_TX_SCell=DL_TX_PCell), as already stated above.

The apparatus as shown in FIG. 2 may further comprise a control module 22 (represented by a dashed rectangle). The control module 22 calculates the receiving timing at said device 20, wherein said receiving timing is (calculated as) a sum of a timing of said transmitting said downlink transmission and the time difference.

According to still further embodiments of the present invention, the connection controller 21 receives a second inter-site control transmission comprising at least uplink channel configuration information, and receives a third inter-site control transmission comprising at least detection information for detection of certain downlink transmission resources of a downlink control transmission on said primary carrier, said certain downlink transmission resources being indicative of at least said uplink transmission resources. Further, the connection controller 21 receives the downlink control transmission on said primary carrier, detects the certain downlink transmission resources of the downlink control transmission based on the detection information, and determines said uplink transmission resources based on the certain downlink transmission resources and the uplink channel configuration information.

In other words, the pico eNB is provided (by the macro eNB) with all the information needed for the detection of PDCCH transmitted by macro eNB towards UE (configured in CA in between F1 and F2). That is, the pico eNB searches similar to the UE the search space of a downlink transmission for downlink resources (containing PDCCH) intended for the UE. For that, the pico eNB needs to know detection information, for example the search space and an identifier of the certain UE (i.e. cell radio network temporary identifier C-RNTI) for a correlation-based approach of decoding information elements in the search space. Having the detection information, the pico eNB can "listen" to the downlink transmission and search the search space for the certain downlink resources (by correlating with the e.g. C-RNTI). When the certain resource(s) is(are) found, the pico eNB knows which downlink resources are allocated for the certain UE and thus knows (based on the allocated downlink resources and a PUCCH configuration, that is the uplink channel configuration information) which uplink resources are intended for the certain UE.

Afterwards, the pico eNB receives the PDCCH, and derives the information necessary to sniff the transmission of UCI on PCell.

According to still further embodiments of the present invention, the connection controller 21 receives a fourth inter-site control transmission comprising at least said uplink transmission resources, and decodes said uplink transmission resources from said inter-site control transmission.

In other words, the pico eNB is provided (by the macro eNB) with information needed for the detection of PUSCH/PUCCH that cannot be derived from PDCCH (e.g. periodic CQI). As already stated above, that information includes, for example, uplink bandwidth, (PCell) uplink carrier frequency (from the SIB2), as well as the information that is contained in the PUCCH-config information element which contains information on the number of PRBs reserved for PUCCH, amount of these resources that are reserved for scheduling requests, reserved for A/N, and for periodic CSI transmission.

Uplink resources used for the transmission of UCI on PCell are also known at the pico eNB because either signaled by the macro eNB (e.g. PUCCH resources used for transmission periodic CQI) or can be derived from PDCCH allocation transmitted on PCell (could be an uplink allocation (i.e. PUSCH resources), as well as a downlink allocation with implicitly allocated PUCCH resources for HARQ A/N transmission; requires that the pico eNB is able to listen and decode the PDCCH allocation to the UE transmitted by the macro eNB on F1), or on SCell (implicitly known at the pico eNB).

By knowing the frequency resources (or in case of TDD the respective time slots) used for UCI transmission (this might be either PUCCH or PUSCH resources) and having an estimate of the uplink receiving timing of the transmitted signal on F1 at the pico eNB (i.e. UL_Rx_PCell_at_pico), the pico eNB can make an attempt to detect and decode the corresponding uplink signal, and then use the decoded UCI for subframe-based L1/L2 RRM (packet scheduling (PS), AMC, HARQ, etc.).

It is to be noted that, according to exemplary embodiments of the present invention, the uplink transmission resources may comprise at least one of a frequency, a transmission format (e.g. PUCCH format 1a/1b) and a time slot, the uplink control information may comprise at least one of a CQI and HARQ A/N information, each of the inter-site signalings may be a X2 signaling, and the detection information may comprise at least one of a search space within the downlink control transmission and an identification information of an intended receiver, e.g. an intended UE.

Figure 3:
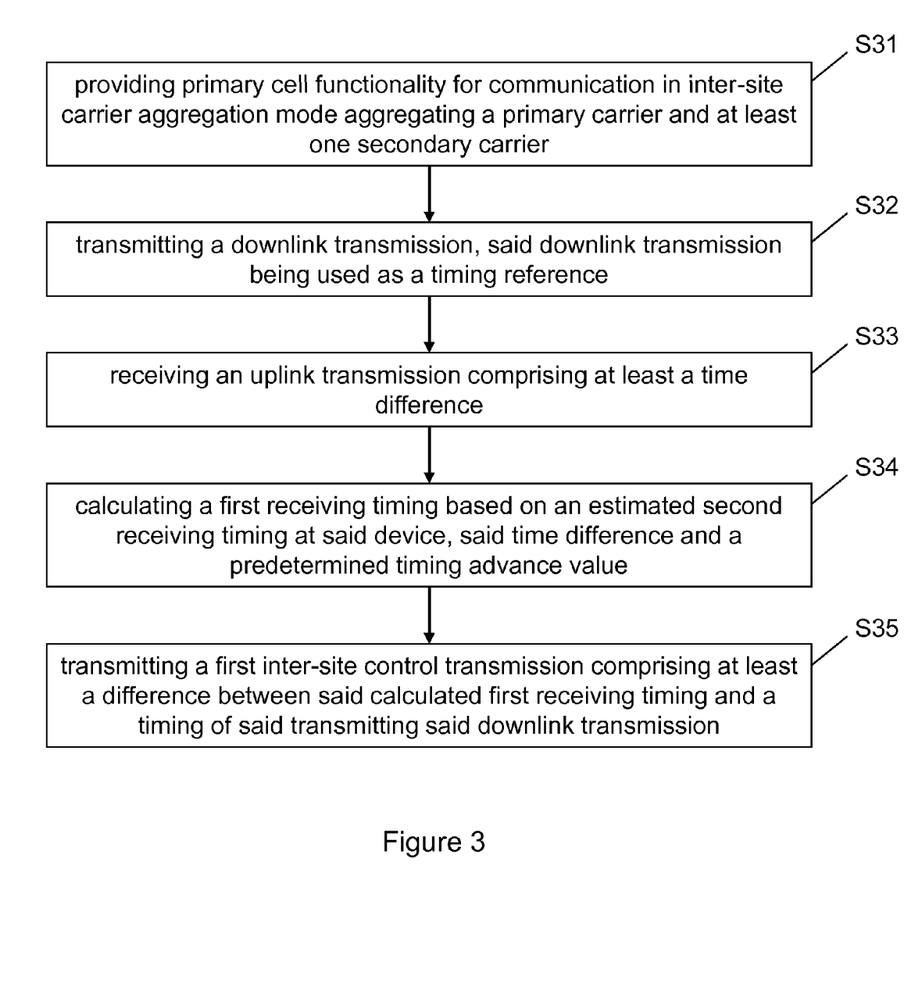
FIG. 3 is a schematic diagram of a procedure according to exemplary embodiments of the present invention.

FIG. 3 is a schematic diagram of a procedure according to exemplary embodiments of the present invention.

As shown in FIG. 3, a procedure according to exemplary embodiments of the present invention comprises an operation of providing primary cell functionality for communication in inter-site carrier aggregation mode aggregating a primary carrier and at least one secondary carrier, an operation of transmitting a downlink transmission, said downlink transmission being used as a timing reference, an operation of receiving an uplink transmission comprising at least a time difference, an operation of calculating a first receiving timing based on an estimated second receiving timing at the performing device, said time difference and a predetermined timing advance value, and an operation of transmitting a first inter-site control transmission comprising at least a difference between said calculated first receiving timing and a timing of said transmitting said downlink transmission.

According to a variation of the procedure shown in FIG. 3, exemplary additional operations are given, which are inherently independent from each other as such. According to such variation, an exemplary method according to exemplary embodiments of the present invention may comprise an operation of transmitting a second inter-site control transmission comprising at least detection information for detection of certain downlink transmission resources of a downlink control transmission on said primary carrier, said certain downlink transmission resources being indicative of at least uplink transmission resources for an uplink control information transmission on said primary carrier.

According to a variation of the procedure shown in FIG. 3, exemplary additional operations are given, which are inherently independent from each other as such. According to such variation, an exemplary method according to exemplary embodiments of the present invention may comprise an operation of transmitting a third inter-site control transmission comprising at least uplink transmission resources for an uplink control information transmission on said primary carrier.

According to a variation of the procedure shown in FIG. 3, exemplary details of the calculating operation are given, which are inherently independent from each other as such. Such exemplary calculating operation according to exemplary embodiments of the present invention may comprise an operation of computing said first receiving timing UL_Rx_PCell_at_pico based on said estimated second receiving timing at said device UL_Rx_PCell at macro, said time difference T_diff and said predetermined timing advance value TA using the formula $$UL\_Rx\_PCell\_at\_pico=UL\_Rx\_PCell\_at\_macro-T\_diff-TA+4ms.$$

It is to be noted that the procedure shown in FIG. 3 may be operable at or by a base station or access node of a cellular system, and may be operable in at least one of a LTE and a LTE-A cellular system. Further, the uplink transmission resources may comprise at least one of a frequency, a transmission format and a time slot, the downlink transmission resources may comprise at least one of a frequency and a time slot, and the uplink control information may comprise at least one of a channel quality indicator and a hybrid automatic repeat request acknowledgement/negative acknowledgement information. Further, each of the inter-site control transmissions may be a X2 signaling, and the detection information may comprise at least one of a search space within the downlink control transmission and an identification information of an intended receiver.

Figure 4:
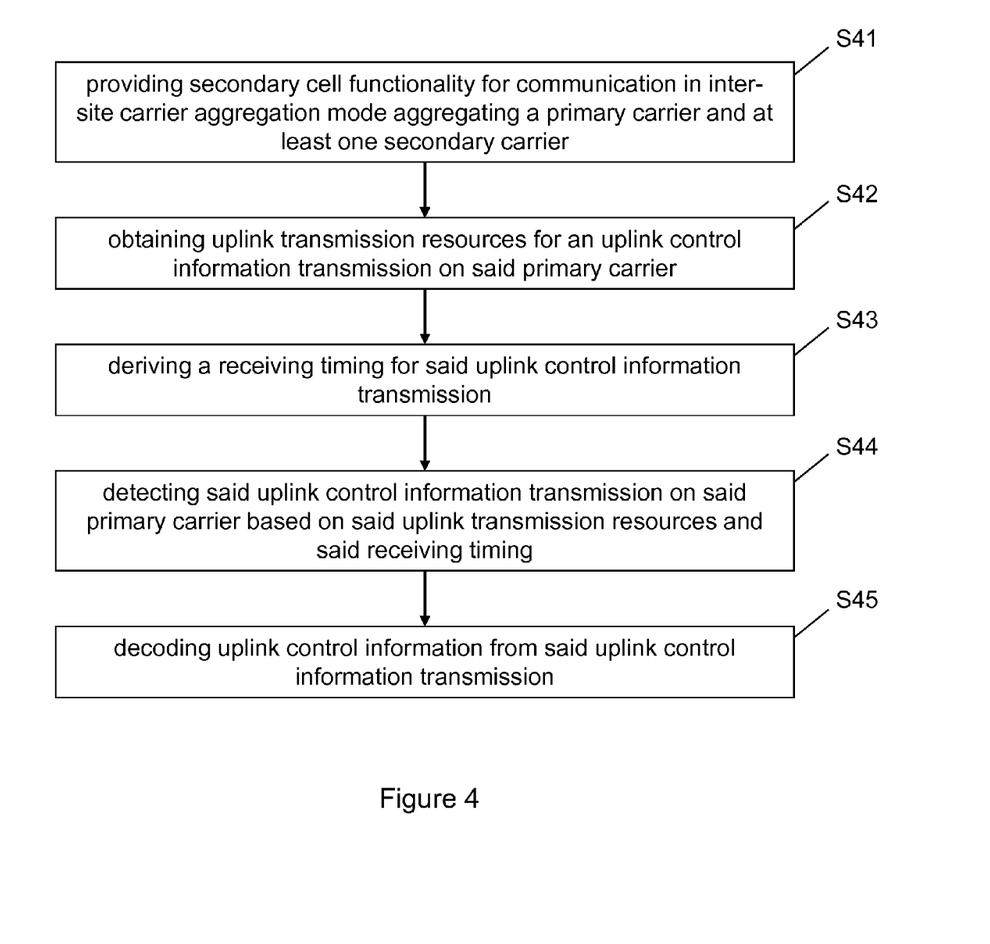
FIG. 4 is a schematic diagram of a procedure according to exemplary embodiments of the present invention.

FIG. 4 is a schematic diagram of a procedure according to exemplary embodiments of the present invention.

As shown in FIG. 4, a procedure according to exemplary embodiments of the present invention comprises an operation of providing secondary cell functionality for communication in inter-site carrier aggregation mode aggregating a primary carrier and at least one secondary carrier, an operation of obtaining uplink transmission resources for an uplink control information transmission on the primary carrier, an operation of deriving a receiving timing for said uplink control information transmission, an operation of detecting the uplink control information transmission on said primary carrier based on said uplink transmission resources and said receiving timing, and an operation of decoding uplink control information from said uplink transmission.

According to a variation of the procedure shown in FIG. 4, exemplary additional operations and exemplary details of the deriving operation are given are given, which are inherently independent from each other as such. According to such variation, an exemplary method according to exemplary embodiments of the present invention may comprise an operation of transmitting a downlink transmission, said downlink transmission being used as a timing reference. An exemplary deriving operation according to exemplary embodiments of the present invention may comprise an operation of receiving a first inter-site control transmission comprising at least a time difference, and an operation of calculating said receiving timing at the performing device, wherein said receiving timing is (calculated as) a sum of a timing of said transmitting said downlink transmission and said time difference.

According to a variation of the procedure shown in FIG. 4, exemplary details of the obtaining operation are given, which are inherently independent from each other as such. Such exemplary obtaining operation according to exemplary embodiments of the present invention may comprise an operation of receiving a second inter-site control transmission comprising at least channel configuration information, an operation of receiving a third inter-site control transmission comprising at least detection information for detection of certain downlink transmission resources for a downlink control transmission on said primary carrier, said certain downlink transmission resources being indicative of at least said uplink transmission resources, an operation of receiving said downlink control transmission on said primary carrier, an operation of detecting said certain downlink transmission resources of said downlink control transmission based on the detection information, and an operation of determining said uplink transmission resources based on said certain downlink transmission resources and the uplink channel configuration information.

According to a variation of the procedure shown in FIG. 4, exemplary details of the obtaining operation are given, which are inherently independent from each other as such. Such exemplary obtaining operation according to exemplary embodiments of the present invention may comprise an operation of receiving a fourth inter-site control transmission comprising at least said uplink transmission resources, and an operation of decoding said uplink transmission resources from said fourth inter-site control transmission.

It is to be noted that the procedure shown in FIG. 4 may be operable at or by a base station or access node of a cellular system, and may be operable in at least one of a LTE and a LTE-A cellular system. Further, the uplink transmission resources may comprise at least one of a frequency, a transmission format and a time slot, the downlink transmission resources may comprise at least one of a frequency, and a time slot, the uplink control information may comprise at least one of a channel quality indicator and a hybrid automatic repeat request acknowledgement/negative acknowledgement information, each of the inter-site control transmissions may be a X2 signaling, and the detection information may comprise at least one of a search space within the downlink control transmission and an identification information of an intended receiver.

Exemplary embodiments of the present invention can not fully guarantee that uplink signals transmitted from different UEs are received synchronized at the pico eNB. That means, depending on the deployment scenario (i.e. distance between macro eNB and pico eNB) and on the load the uplink detection probability at the pico eNB might become low. Especially in high load conditions the proposed solution may not provide excellent results. However, it might still guarantee acceptable uplink detection probability at pico eNB with low number of active users in the corresponding macro cell area.

According to exemplary embodiments of the present invention, new terminal capability is not required to implement the proposed mechanisms, that is, in principle the present application may be implemented in networks with LTE Rel-10 terminals.

It is to be noted that uplink power control might also play an important role. UEs close to the pico eNB but still power controlled by the macro eNB might be received at the pico with a power level several dB higher compared to the received signals from UEs which are close to the macro eNB. However, UEs close to the pico eNB are those that will be most likely be configured in inter-site CA mode. Also, users close to the pico eNB typically experience similar propagation delays to both the macro eNB and the pico eNB, which means their uplink transmission might still be received "almost" in synch at the pico eNB though time alignment is done at the macro eNB.

The above-described procedures and functions may be implemented by respective functional elements, processors, or the like, as described below.

In the foregoing exemplary description of the network entities, only the units that are relevant for understanding the principles of the invention have been described using functional blocks. The network entities may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 7:
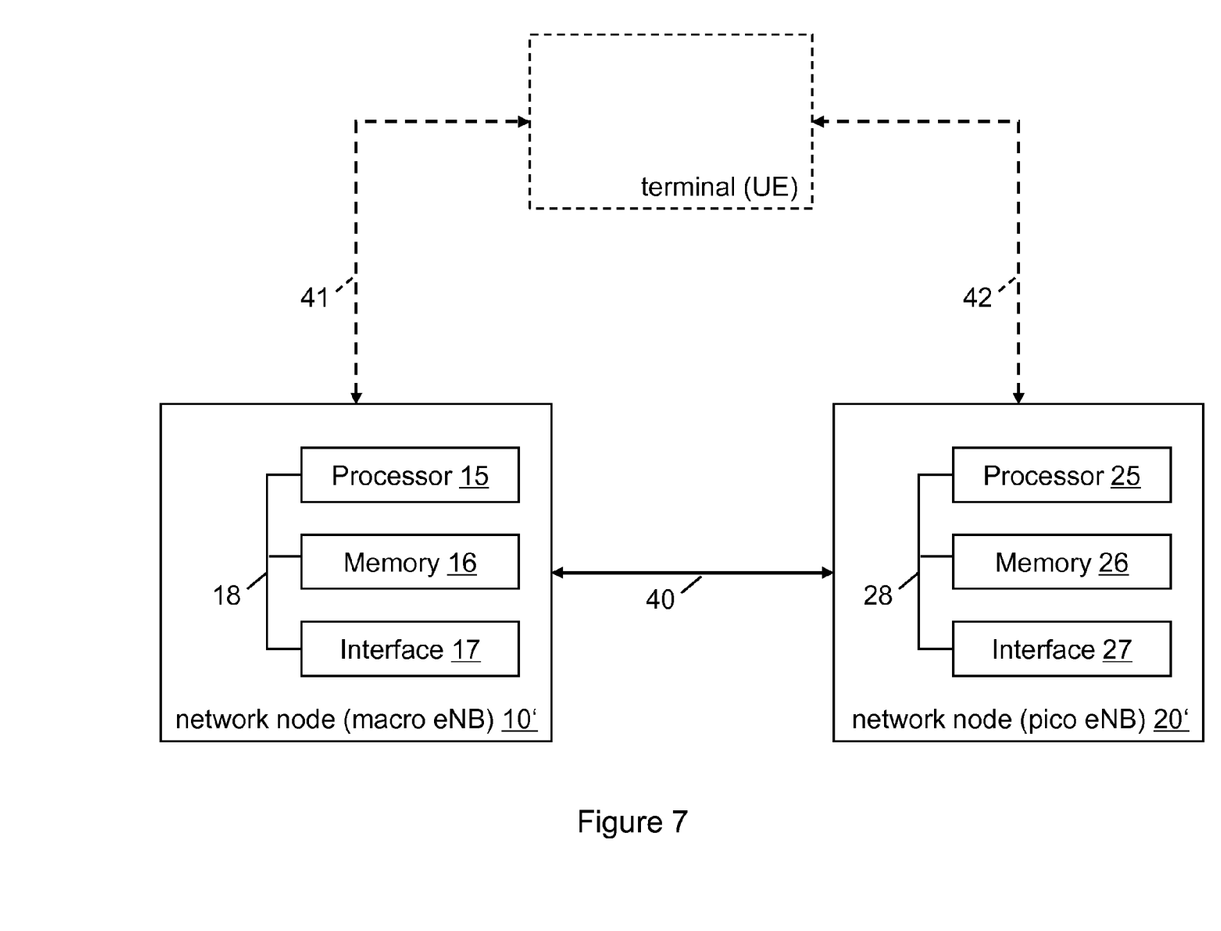
FIG. 7 is a block diagram alternatively illustrating apparatuses according to exemplary embodiments of the present invention.

In FIG. 7, an alternative illustration of apparatuses according to exemplary embodiments of the present invention is depicted. As indicated in FIG. 7, according to exemplary embodiments of the present invention, the device 10' (corresponding to macro eNB 10) comprises a processor 15, a memory 16 and an interface 17, which are connected by a bus 18 or the like, and the device 20' (corresponding to pico eNB 20) comprises a processor 25, a memory 26 and an interface 27, which are connected by a bus 28 or the like, and the devices may be connected via a link 40. Both the macro eNB as well as the pico eNB may be connected to a further device such as a terminal (UE) via respective links 41 and 42.

The processor 15/25 and/or the interface 17/27 may also include a modem or the like to facilitate communication over a (hardwire or wireless) link 40/41/42, respectively. The interface 17/27 may include a suitable transceiver coupled to one or more antennas or communication means for (hardwire or wireless) communications with the linked or connected device(s), respectively. The interface 17/27 is generally configured to communicate with at least one other apparatus, i.e. the interface thereof.

The memory 16/26 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 comprises at least one processor 15, at least one memory 16 including computer program code, and at least one interface 17 configured for communication with at least another apparatus. The processor (i.e. the at least one processor 15, with the at least one memory 16 and the computer program code) is configured to perform providing primary cell functionality for communication in inter-site carrier aggregation mode aggregating a primary carrier and at least one secondary carrier (thus the apparatus comprising corresponding means for providing), to perform transmitting a downlink transmission, said downlink transmission being used for as a timing reference (thus the apparatus comprising corresponding means for transmitting), to perform receiving an uplink transmission comprising at least a time difference (thus the apparatus comprising corresponding means for receiving), to perform calculating a first receiving timing based on an estimated second receiving timing at said apparatus, said time difference and a predetermined timing advance value (thus the apparatus comprising corresponding means for calculating), and to perform transmitting a first inter-site control transmission comprising at least a difference between said calculated first receiving timing and a timing of said transmitting said downlink transmission.

According to exemplary embodiments of the present invention, an apparatus representing the network node 20 comprises at least one processor 25, at least one memory 26 including computer program code, and at least one interface 27 configured for communication with at least another apparatus. The processor (i.e. the at least one processor 25, with the at least one memory 26 and the computer program code) is configured to perform providing secondary cell functionality for communication in inter-site carrier aggregation mode aggregating a primary carrier and at least one secondary carrier (thus the apparatus comprising corresponding means for providing), to perform obtaining uplink transmission resources for an uplink control information transmission on said primary carrier (thus the apparatus comprising corresponding means for obtaining), to perform deriving a receiving timing for said uplink control information transmission (thus the apparatus comprising corresponding means for deriving), to perform detecting said uplink control information transmission on said primary carrier based on said uplink transmission resources and said receiving timing (thus the apparatus comprising corresponding means for detecting), and to perform decoding uplink control information from said uplink control information transmission (thus the apparatus comprising corresponding means for decoding).

For further details regarding the operability/functionality of the individual apparatuses, reference is made to the above description in connection with any one of FIGS. 1 to 6, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for uplink control information signaling in inter-site downlink carrier aggregation scenarios. Such measures exemplarily comprise obtaining uplink transmission resources for an uplink control information transmission on said primary carrier, deriving a receiving timing for said uplink control information transmission, detecting said uplink control information transmission on said primary carrier based on said uplink transmission resources and said receiving timing, and decoding uplink control information from said uplink control information transmission.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
A/N acknowledgment/negative acknowledgement
AMC adaptive modulation and coding
C-RNTI cell radio network temporary identifier
CA carrier aggregation
CQI channel quality indicator
E-UTRA Evolved Universal Terrestrial Radio Access
eNB evolved NodeB
FDD frequency division duplex
L1 Layer 1
L2 Layer 2
LTE Long Term Evolution
PCell primary cell
PDCCH physical downlink control channel
PHICH physical hybrid ARQ indicator channel
PRB physical resource blocks
PS packet scheduling
PUCCH physical uplink control channel PUSCH physical uplink shared channel
RRM radio resource management
SCell secondary cell
SIB system information block
TA timing advance
TDD time division duplex
UCI uplink control information
UE user equipments

The invention claimed is:

1. A method of a device providing primary cell functionality for communication in inter-site carrier aggregation mode aggregating a primary carrier and at least one secondary carrier, comprising
   transmitting a downlink transmission, and using a time of said downlink transmission as a timing reference;
   receiving from a user equipment (UE) an uplink transmission comprising at least a time difference value;
   calculating a first receiving timing based on an estimated second receiving timing at said device, said time difference value and a predetermined timing advance value; and
   transmitting a first inter-site control transmission comprising at least a difference between said calculated first receiving timing and the timing reference; wherein:
      said first receiving timing is for uplink signaling from the UE. to he received at another device providing secondary cell functionality; and
      the estimated second receiving timing is for uplink signaling, from the UE to be received at the device providing primary cell functionality.

2. The method according to claim 1, further comprising transmitting a second inter-site control transmission comprising at least detection information for detection of certain downlink transmission resources of a downlink control transmission to the UE on said primary carrier, said certain downlink transmission resources being indicative of at least uplink transmission resources for an uplink control information transmission from the UE on said primary carrier.

3. The method according to claim 1, further comprising transmitting a third inter-site control transmission comprising at least uplink transmission resources for an uplink control information transmission on said primary carrier.

4. The method according to claim 1, wherein, in relation to said calculating said method further comprises
   computing said first receiving timing UL_Rx_PCell_at_pico based on said estimated second receiving timing at said device UL_Rx_PCell_at_macro, said time difference value T_diff and said predetermined timing advance value TA using the formula ULRx_PCell_at_pico =UL_Rx_PCell_at macro - T_diff -TA +4ms.

5. The method according to claim 1, wherein:
   the method is operable at or by a base station or access node operating in at least one of a LTE and a LTE-A cellular system, and
   each of said inter-site control transmissions is a X2 signaling.

6. An apparatus comprising:
   at least one processor; and
   at least one memory including computer program code,
   the at least one memory and the computer program code configured, with the at least one processor, to cause the apparatus to provide primary cell functionality for communication in inter-site carrier aggregation mode aggregating a primary carrier and at least one secondary carrier, by performing at least the following:
   transmit a downlink transmission, and use a time of said downlink transmission as a timing reference;
   receive from a user equipment (UE) an uplink transmission comprising at least a time difference value; and
   calculate a first receiving timing based on an estimated second receiving timing at said apparatus, said time difference value and a predetermined timing advance value; wherein said connection controller is further configured to transmit a first inter-site control transmission comprising at least a difference between said calculated first receiving timing and the timing reference, and wherein:
      said first receiving timing is for uplink signaling from the UE to be received at another device providing secondary cell functionality; and
      the estimated second receiving timing is for uplink signaling from the UE to be received at the apparatus providing primary cell functionality.

7. The apparatus according to claim 6, wherein the at least one memory and the computer program code are further configured, with the at least one processor, to cause the apparatus to perform at least the following:
   transmit a second inter-site control transmission comprising at least detection information for detection of certain downlink transmission resources of a downlink control transmission on said primary carrier, said certain downlink transmission resources being indicative of at least uplink transmission resources for an uplink control information transmission on said primary carrier.

8. The apparatus according to claim 6, wherein the at least one memory and the computer program code are further configured, with the at least one processor, to cause the apparatus to perform at least the following:
   transmit a third inter-site control transmission comprising at least uplink transmission resources for an uplink control information transmission on said primary carrier.

9. The apparatus according to claim 6, wherein:
   said first receiving timing UL_Rx_PCell_at_pico is calculated based on said estimated second receiving timing at said apparatus UL_Rx_PCell_at_macro, said time difference value T_diff and said predetermined timing advance value TA using the formula UL_Rx_PCell_ at_pico =UL_Rx_PCell_at_macro- T_diff-TA +4 ms.

10. The apparatus according to claim 6, wherein:
    the apparatus is a base station or access node operating in at least one of a LTE and a LTE-A cellular system, and
    each of said inter-site control transmissions is a X2 signaling.

11. An apparatus comprising
    at least one processor; and
    at least one memory including computer program code,
    the at least one memory and the computer program code configured, with the at least one processor, to cause the apparatus to provide secondary cell functionality for communication in inter-site carrier aggregation mode aggregating a primary carrier and at least one secondary carrier by performing at least the following:
    obtain uplink transmission resources for an uplink control information transmission by a user equipment (UE) on said primary carrier;

derive a receiving timing at which time said uplink control information transmission from the UE is to be received at the apparatus;

detect said uplink control information transmission on said primary carrier based on said uplink transmission resources and said receiving timing; and decode uplink control information from said uplink control information transmission.

12. The apparatus according to claim 11, wherein the at least one memory and the computer program code are further configured, with the at least one processor, to cause the apparatus to perform at least the following:

transmit a downlink transmission, and use a time of said downlink transmission as a timing reference; and to receive a first inter-site control transmission comprising at least a time difference value; and calculate said receiving timing at said apparatus, wherein said receiving timing is calculated as a sum of said timing reference and said time difference value.

13. The apparatus according to claim 11, wherein the at least one memory and the computer program code are further configured, with the at least one processor, to cause the apparatus to perform at least the following:

receive a second inter-site control transmission comprising at least uplink channel configuration information;

receive a third inter-site control transmission comprising at least detection information for detection of certain downlink transmission resources of a downlink control transmission on said primary carrier, said certain downlink transmission resources being indicative of at least said uplink transmission resources;

receive said downlink control transmission on said primary carrier;

detect said certain downlink transmission resources of said downlink control transmission based on said detection information; and determine said uplink transmission resources based on said certain downlink transmission resources and said uplink channel configuration information.

14. The apparatus according to claim 11, wherein the at least one memory and the computer program code are further configured, with the at least one processor, to cause the apparatus to perform at least the following:

receive a fourth inter-site control transmission comprising at least said uplink transmission resources; and decode said uplink transmission resources from said inter-site control transmission.

15. The apparatus according to claim 11, wherein:

the apparatus is a base station or access node operating in at least one of a LTE and a LTE-A cellular system, and each of said inter-site control transmissions is a X2 signaling.

* * * * *

UNITED STATES PATENT AND TRADEMARK OFFICE
CERTIFICATE OF CORRECTION

PATENT NO. : 9,629,133 B2  
APPLICATION NO. : 14/405586  
DATED : April 18, 2017  
INVENTOR(S) : Claudio Rosa and Frank Frederiksen Page 1 of 1

It is certified that error appears in the above-identified patent and that said Letters Patent is hereby corrected as shown below:

In the Claims

In Claim 1:
Column 17, Line 26, "he" should be deleted and --be-- should be inserted.

In Claim 4:
Column 17, Line 51, "ULRx_PCell.sub.—at_pico=UL_Rx_PCell.sub.—at macro – T_diff-TA+4ms." should be deleted and --UL_Rx_Pcell_at_pico=UL_Rx_PCell_at_macro-T_diff-TA+4ms-- should be inserted.

In Claim 9:
Column 18, Line 49, "TA/4ms." should be deleted and --TA + 4ms.-- should be inserted.

Signed and Sealed this  
Thirtieth Day of May, 2017

Michelle K. Lee  
*Director of the United States Patent and Trademark Office*